Patented Dec. 2, 1941

2,264,790

UNITED STATES PATENT OFFICE 2,264,790

PURIFYING WATER AND SEWAGE

John Harry Coleman, Warren Township, Somerset County, N. J., assignor of one-half to Westvaco Chlorine Products Corporation, New York, N. Y., a corporation of Delaware No Drawing. Application October 24, 1939,
Serial No. 301,063

10 Claims. (Cl. 210—2)

This invention or discovery relates to purifying water and sewage; and it comprises a method of forming, or qualifying, a sludge in the purification of water or sewage by the aid of a particular iron liquor giving a separation of ferric phosphate on neutralization, such iron liquor containing ferric chloride and phosphates held in solution thereby, the phosphates being usually ferric phosphate or alumina phosphates, or both as in using the mixed phosphates separated as a "white mud" by-product in working up rock phosphate for sodium phosphates and phosphoric acid; all as more fully hereinafter set forth and as claimed.

In purifying water and in treating sewage, iron salts and aluminum salts are often used; the salt being neutralized in the water to form a gel or floc. Where a ferrous salt, such as ferrous sulfate, is used in purifying water, the oxygen dissolved in the water converts the ferrous oxide into ferric oxide on neutralization of the acid. Ferric chloride gives a hydrated ferric oxide gel directly. Aluminum salts give a similar gel of hydrated alumina on neutralization.

In water where there is a minor amount of turbidity, the action of such a gel or floc is flocculating; turbid particles (and bacteria as well) are collected by a floc formed on neutralization and put in a form which can be settled and filter pressed. With hard water the carbonates present may be sufficient to effect neutralization. Otherwise, there is an addition of lime or soda. With sewage containing much organic matter the actions are much more complicated; the salts act both as coagulants and as placing colloid suspensions into better form for handling. Experience has shown that the presence of ferric chloride in sewage sludge materially aids in dewatering on the rotary filters. Where the sewage treatment process involves aeration the iron salts are also useful as oxygen carriers. In sewage treatment iron salts are often used in such a way as to aid in maintaining pH control.

In all cases, however, the precipitate is either ferric hydroxide or aluminum hydroxide. In either case the physical properties of the gel are much the same and there is not much difference as regards settling or filtering the sludge produced. Both leave much to be desired as regards convenience in dewatering.

With both classes of salts the action of a base is not instantaneous in producing a gel; the first action is the production of a soluble basic salt. In the case of ferric chloride solution the first addition of a base, such as soda or ammonia, leaves the liquid clear. At this time it may be regarded either as an oxychloride or as a solution of ferric oxide in ferric chloride. The chemical distinction is verbal. But the result is a delayed formation of floc; a floc does not form until neutralization is well advanced.

I have found that gels of these sesquioxide bases, $Fe_2O_3$ and $Al_2O_3$ containing also sesquioxide phosphates are better both for purifying water and in treating sewage than the sesquioxide gels alone. They settle and press better. These compound gels are produced by using an iron liquor containing ferric phosphate or aluminum phosphate dissolved in a ferric chloride solution.

Both ferric phosphate and phosphate of alumina are quite insoluble in water and they can ordinarily only be brought into aqueous solution by the use of strong acid; the use of somewhat more acid than corresponds to the production of di-hydrogen iron phosphate. Such a solution because of its high acidity is not practicable for use in treating water or sewage.

But I have found that either ferric phosphate or aluminum phosphate can be dissolved readily in ferric chloride solution to form what is relatively a non-acid liquid well adapted for use in clarifying water and treating sewage. The pH of the ferric chloride solution is somewhere around 3 and on solution of ferric phosphate therein it may lose considerable acidity acquiring, say, a pH of 4. In other words, the ferric phosphate has diminished the acidity of the ferric chloride solution somewhat and has not added new acidity. The lowered requirement for base is sometimes convenient when relying on the carbonates of hard water; it sometimes obviates the necessity of adding lime or soda in obtaining good clarification. In water the action of a neutralizing agent on this phosphate liquor is quicker in point of time than with ferric chloride and there is, more or less, a two-stage separation; a separation first of ferric phosphate in gel form and secondly of ferric oxide itself. This double precipitation gives advantages in treating both water and sewage in so far as the production of readily settling and readily pressed sludges is concerned. The complex gels appear to separate and press more readily than the simple gels.

For the present purposes ferric phosphates and aluminum phosphate are more or less interchangeable; they both give the same type of purifying agent on solution in ferric chloride. Each, however, has special advantages in some relations; a solution of ferric phosphate in ferric chloride in treating sewage sludge, for example. But for general purposes, a phosphate liquor containing both the sesquioxide bases is suitable and such a liquor can be conveniently made by using a byproduct which is known as "white mud" in the phosphate industry. See Coleman Patents Nos. 1,961,127 and 2,062,866. In opening up rock phosphate with sulfuric acid for the production of phosphoric acid or phosphates, the clear highly acid solution separated from the calcium sulfate and gangue, on gradual neutralization at first throws down a precipitate of the two sesquioxides as phosphates—"white mud". In making sodium phosphate from the crude acid, on gradually neutralizing the acid liquor with sodium carbonate this precipitate comes down before all the free phosphoric acid is converted into mono-sodium phosphate. The white mud is sometimes worked up by methods, not here important, for recovering the contained $P_2O_5$. It always contains both ferric phosphate and phosphate of alumina and though their ratio varies considerably, this is not generally important for the present purposes.

In the present invention a flocculating reagent or iron liquor is advantageously made by dissolving white mud in a solution of ferric chloride to the limit of solubility. Ferric phosphate or aluminum phosphate, or their mixtures from other sources, may be used, but white mud is cheap and desirable.

Ferric chloride solution containing the equivalent of ferric phosphate may also be made by dissolving other phosphates in the ferric chloride solution, or even phosphoric acid itself. Sodium phosphates may be used. A cheap and convenient iron liquor desirable for some purposes can be made by dissolving calcium phosphate in ferric chloride solution. During neutralization of the solution with sodium carbonate the first precipitate produced is that of ferric phosphate. Later calcium compounds come down with the ferric oxide gel; as carbonates. The particular iron liquor exercises several types of flocculating action and the sludges produced are readily handled.

With all the iron liquors containing $P_2O_5$, under the present invention, on addition of a small quantity to hard water containing lime and magnesia as carbonates, the liquor is neutralized by the carbonates and there is produced a composite floc of sesquioxide phosphate and ferric oxide. Calcium and magnesium phosphates may also be produced. As stated, the precipitates are not homogeneous nor are the precipitations absolutely simultaneous. With hard water a readily settling floc is produced which can be readily pressed if this be desired. It has fertilizing value because of the contained $P_2O_5$. The same type of liquor is useful in the various sewage treating processes and for this purpose the pH can be adjusted within rather wide limits. The pH in sewage treatment is always extremely important.

The new ferric phosphate-chloride agent has its maximum efficiency when employed in treating waters at a pH of around 7 (neutrality), which is an advantage. However, as stated, the agent works well over a rather wide pH range, on both sides of neutrality.

In the case of the ferric chloride-ferric phosphate coagulant, I find that a molecular $FeCl_3:FePO_4$ ratio of about 5:3 is best under most circumstances. This amounts roughly to 180 pounds $FeCl_3$ per 100 pounds $FePO_4$. With aluminum phosphate in place of ferric phosphate the best molecular ratio is about $5FeCl_3:2AlPO_4$.

The following specific examples are illustrative of typical good ways of carrying out the invention:

Example 1.—A turbid water was treated with a liquid $FeCl_3$-$FePO_4$ phosphate liquor made by dissolving 3 mols of ferric phosphate in a strong aqueous solution of 5 mols $FeCl_3$. The liquor had a pH of about 4. The amount added corresponded to 0.08 gram Fe per liter (0.22 gram of the total chloride-phosphate per liter). Treatment involved stirring the agent into the water, bringing the pH to 8 by addition of soda ash, and allowing the water to stand. At the end of 2 hours, the upper 15 per cent by volume of the water was clear; that is, in a cylindrical container the water showed clear for about 15 per cent of the distance down from the surface to the bottom. By contrast, treatment of the same water in the same way with an equal amount of Fe as $FeCl_3$ (0.23 gram $FeCl_3$ per liter) produced only 11 per cent clear water in the same settling time. The sludge produced by the compound flocculant settled and pressed more readily than that produced with the ferric chloride alone. It was denser.

Example 2.—A sample of turbid water was treated for clarification in a manner similar to that described in Example 1, but employing a higher proportion of iron liquor; a proportion corresponding to 0.13 gram Fe per liter instead of 0.08 gram. The pH value of the water before treatment was 7.45; just on the alkaline side of neutrality. A batch of the water treated with the ferric chloride, ferric phosphate agent, allowed to settle and filtered gave a clear filtrate of pH value 6.5. Thus in the present process a substantially neutral turbid water was effectively treated for removal of suspended matter and discharged still practically neutral. By contrast, a batch of the same water treated with an equivalent amount of $FeCl_3$ alone (0.13 gram Fe per liter) after settling and filtering exhibited a pH of 4.65; which is quite acid.

Example 3.—In another example the deflocculation treatment was carried out at a pH of 7 (neutrality). Treatment was with 0.33 gram Fe per liter. Otherwise the conditions were as in Examples 1 and 2. The results are tabulated below:

|  | Agent employed | |
| --- | --- | --- |
|  | $5FeCl_3+3FePO_4$ | $FeCl_3$ |
| Per cent of clear liquid, after— | | |
| 1 hr | 45 | 12. |
| 2 hrs | 65 | 20. |
| 3 hrs | 75 | 55. |
| Clarity | Sparkling | Clear. |

The superiority of the $FeCl_3$-$FePO_4$ iron liquor over simple $FeCl_3$ is markedly apparent in this example wherein treatment is at pH 7.

Example 4.—In another example, illustrative of treatment of the same water under neutral conditions (pH 7), 0.4 gram Fe per liter was employed in treatment, added in the form of $FeCl_3$-$FePO_4$ and as $FeCl_3$ as in Example 1. The water was filtered after 2 hours settling time. The results are tabulated below:

|  | Agent employed | |
| --- | --- | --- |
|  | $5FeCl_3+3FePO_4$ | $FeCl_3$ |
| Percent of clear liquid, after— | | |
| 1 hr | 35 | 8. |
| 2 hrs | 45 | 15. |
| Clarity | Clear | Cloudy. |
| Filtering time for 1 liter | 140 min | 360 min. |
| Filtrate | Sparkling | Cloudy. |
| Filter cake, dry weight | 8.9 grams | 6.4 grams. |
| BOD (cc. of N/10 iodine) | 186 cc | 316 cc. |

Sewage can sometimes be treated as merely turbid water and the new iron phosphate liquor can be used as in the examples just given.

*Example 5.*—In treating such a sewage by simple flocculation in one particular example the raw sewage has a pH of about 7. The iron phosphate liquor is introduced into a flow of the raw screened sewage and the mixture discharged into neutralizing tanks. With the particular sewage treated it is found that about 250 pounds of the ferric phosphate liquor containing about 2.5 parts of iron per gallon suffices for a million gallons of sewage. Other sewages of course require more or less. In this particular case the initial pH of 7 fell to about 6.5 and but little lime was required in the neutralizing step. With ferric chloride itself considerably more lime would be required. After neutralization of the treated sewage it was sent to settling tanks to remove the sludge. Sludge separation was very rapid. In contrast with the use of ferric chloride alone, the settling time is about halved. This means the use of smaller or fewer settling tanks. The sludge can be readily dewatered in rotary continuous filters without special treatment. In contrast the sludge produced with ferric chloride alone requires some intermediate treatment. The sludge produced with the phosphate liquor behaves as if it contained a filter aid. The dewatered and dry sludge has fertilizing value due to the content of phosphate and of ammonia taken up by the phosphates. With this particular water the sludge produced with ferric chloride alone is without value; it is dumped or burned.

In treating this particular water complete sterilization is not effected either by ferric chloride alone or by the ferric phosphate liquor and it is customary to add chlorine subsequently to reduce the bacterial count. For reasons not clearly understood, it is found in practice that the consumption of chlorine required for sterilization is reduced by about 40 to 50 per cent in using the new iron liquor as compared with the ferric chloride alone.

In modern activated sludge processes, the sludge is not formed by the coagulant. But it is necessary to add ferric chloride, and particularly in winter, to promote settling, dewatering and handling. In the activated sludge process there is a production of clean potable water and a final sludge which has enough fertilizing value to make it marketable. In these methods the screened sewage is mixed with large volumes of returned sludge containing vigorously functioning organisms ("activated sludge") and the mixture agitated and thoroughly aerated. In this action the aerobic organisms in the presence of the air consume the soluble matter in the water and themselves increase at its expense. After aeration the liquid is settled and a large part of the sludge goes back for admixture with raw sewage. The rest of the sludge is dewatered and dried and sold as a fertilizer. It is marketable for that purpose.

In one way of looking at this process it amounts to a cyclic circulation of an aerated bacterial culture with a feed of raw sewage at one point and a withdrawal of clean water at another. The sludge separated after aeration is quite voluminous and sometimes 90 per cent is sent back for admixture with the incoming raw sewage. The remaining 10 per cent leaves the system; it is dewatered and finished on rotary filters, being finally dried and marketed as fertilizer.

Experience has shown that an addition of ferric chloride to the sludge will put it in such form that it can be put through the rotary filters at many times the speed of the unmixed sludge. In this addition the ferric chloride exercises a flocculating action, which can be duplicated by aluminum sulfate but it also has other actions which are of value in handling the sludge. Among these actions is that of acting as an oxygen carrier. Aluminum sulfate is not considered an equivalent of ferric chloride in handling activated sludge.

I have found that the use of the iron liquor of the present invention in lieu of ferric chloride solution in handling activated sludge is more advantageous. It gives a quicker settling, denser sludge readily pressed. As regards obtaining clarified water the same advantage appears as in the foregoing example treating turbid water. And the phosphate liquor gives a substantial added fertilizing value to the dried sludge. The fertilizing value of activated sludge is mainly due to its nitrogen content and it is rather low in $P_2O_5$.

*Example 6.*—In handling sewage containing much dissolved organic matter, the raw sewage is screened, mixed with about 90 per cent of the sludge, later separated and here returned, vigorously agitated with air and settled to form a sludge. Most of the sludge is returned for admixture with raw sewage. To the rest is added ferric chloride phosphate liquor in the proportion of 1.3 pounds Fe to 100 pounds sludge (dry basis). The sludge thus treated settles quickly to a dense body, readily handled on rotary filters of the ordinary type.

In comparative tests using the same filtering equipment, sludge under the present invention gave a throughput per hour about six times as great as that of untreated sludge while sludge treated with iron chloride alone gave an intermediate result. The iron liquor of the present invention and the ferric chloride were both used in amounts corresponding to a weight ratio of 1.3 parts iron (Fe) per 100 parts of dry matter in sludge. In this particular test, the observed throughput of filtered liquor per hour was in the ratio of 62 volumes for untreated sludge, 210 volumes for $FeCl_3$ treated sludge and 360 volumes for sludge treated with a $FeCl_3$-$FePO_4$ liquor.

In other current quick methods of handling sewage an addition of iron is made to the mixture of sludge and sewage undergoing aeration. The sludge is commonly rather acid so that no precipitation of hydrated ferric oxide, as such, takes place. But the iron is of value in serving as an oxygen carrier; it quickens the operation and reduces the size of installation necessary. As before, it gives a better settling sludge. The iron liquor of the present invention used in lieu of ferric chloride gives the same carrier action of iron and it also contributes phosphate in available form to the mixture; it makes it a better nutritive medium for the organisms. For this particular purpose I regard the modification of my invention in which calcium phosphate is dissolved in ferric chloride as particularly good.

What I claim is:

1. In the recovery of the solid of turbid water and aqueous sludges in a form readily settling and filtering, the process which comprises adding thereto a minor amount of an aqueous iron liquor containing ferric chloride and a water-insoluble phosphate dissolved therein and neutralizing the ferric chloride to form a preliminary floc of insoluble phosphate and ultimately a composite floc containing hydrated ferric oxide, as well as said phosphate and the amount of said composite floc being sufficient to collect and remove substantially all of the said solids and the amount of insoluble phosphate dissolved in said liquor being sufficient to give a substantial amount of phosphate floc upon partial neutralization of the said iron liquor and to materially increase the amount of floc formed upon complete neutralization of the ferric chloride, the composite floc so formed having a settling rate substantially greater than that of floc obtainable with ferric chloride alone.

2. The process of claim 1 wherein the dissolved phosphate is a phosphate of a metal sesquioxide.

3. The process of claim 1 wherein the dissolved phosphate is a mixture of ferric and alumina phosphates in the form of the white mud made as a byproduct in recovering phosphates from rock phosphate.

4. The process of claim 1 wherein the dissolved phosphate is calcium phosphate.

5. The process of claim 1 wherein the liquor is neutralized in the water or sludge to form a floc.

6. In the recovery of sewage solids having an enhanced fertilizer value from the activated sludge process of treating sewage, the process which comprises aerating raw sewage in admixture with returned sludge, settling to form a sludge, withdrawing a small fraction of the sludge while recycling the rest, adding to the withdrawn portion of the sludge a minor amount of an aqueous iron liquor containing ferric chloride and a water-insoluble phosphate dissolved therein, sufficient iron liquor being added to produce a composite floc of insoluble phosphate and hydrated ferric oxide capable of collecting substantially all of the suspended matter into a quick settling coagulum and then dewatering and drying the so flocculated sludge to form a fertilizer containing said phosphate in addition to the sludge solids sufficient phosphate being present in the flocculated sludge to reduce the settling rate of the composite sludge substantially below that of the floc obtainable with ferric chloride alone.

7. In the recovery of the solids of turbid water and aqueous sludges in a form readily settling and filtering, the process which comprises adding thereto a small amount of aqueous liquor containing ferric chloride and dissolved ferric phosphate in the approximate molecular ratio $5FeCl_3:3FePO_4$, neutralizing the ferric chloride to form first a floc of insoluble phosphate and ultimately a composite floc of said phosphate and hydrated ferric oxide, the amount of said composite floc being sufficient to flocculate and remove substantially all of the said solids and the amount of ferric phosphate dissolved in said aqueous liquor being sufficient upon partial neutralization of said liquor to give a substantial amount of phosphate floc and to materially increase the amount of composite floc formed upon complete neutralization of the ferric chloride, the composite floc so formed having a settling rate substantially greater than that of a floc obtainable with the ferric chloride alone.

8. In the recovery of solids from turbid water and aqueous sludges in a form readily settling and filtering, the process which comprises adding to the water or sludge at a pH slightly above 7 a small amount of an aqueous liquor containing ferric chloride and a water-insoluble phosphate dissolved therein, settling the composite floc of insoluble phosphate and hydrated ferric oxide formed by the neutralization of the ferric chloride and withdrawing the clarified water at a pH slightly below 7 from the settled composite floc containing said solids, the amount of said composite floc being sufficient to flocculate and remove substantially all of the said solids and the amount of said insoluble phosphate contained in said aqueous liquor being sufficient to give a substantial amount of phosphate floc upon partial neutralization of said liquor and to materially increase the amount of composite floc formed upon complete neutralization of the ferric chloride, the composite floc so obtained having a settling rate substantially greater than that of the floc obtainable with the ferric chloride alone.

9. In the recovery of the solids of turbid water and aqueous sludges in a form readily settling and filtering, the process which comprises adding thereto a ferric chloride solution capable of yielding a floc without delayed action, said ferric chloride solution containing dissolved therein a water-insoluble phosphate in amount sufficient to immediately produce on partial neutralization of the ferric chloride a substantial amount of insoluble phosphate floc capable of initiating flocculation of said solids and of accelerating the production of a compound floc of said phosphate and hydrated ferric oxide, the amount of compound floc ultimately formed being sufficient to flocculate and remove substantially all of the solids contained in said turbid water and aqueous solids.

10. As an improvement in coagulum methods of collecting and removing solid matter from turbid waters, wet sludges and other aqueous liquids having basicity and carrying such solids suspended therein in which a minor amount of ferric chloride solution is added to said aqueous liquids to produce a floc with neutralization by the basicity thereof, the improvement in quickening the development of floc and increasing its amount wherein the ferric chloride solution carries a water-insoluble phosphate in solution, the amount of said phosphate dissolved in said solution being sufficient to materially quicken the formation of a floc by the basicity of the water and to produce an insoluble phosphate floc upon partial neutralization of the ferric chloride and the amount of such ferric chloride solution added to said aqueous liquid being sufficient upon complete neutralization of the ferric chloride by the basicity of said liquid to form a composite floc of hydrated ferric oxide and insoluble phosphate in amount sufficient to collect and remove substantially all of the suspended solids.

JOHN HARRY COLEMAN.